Figure 1:
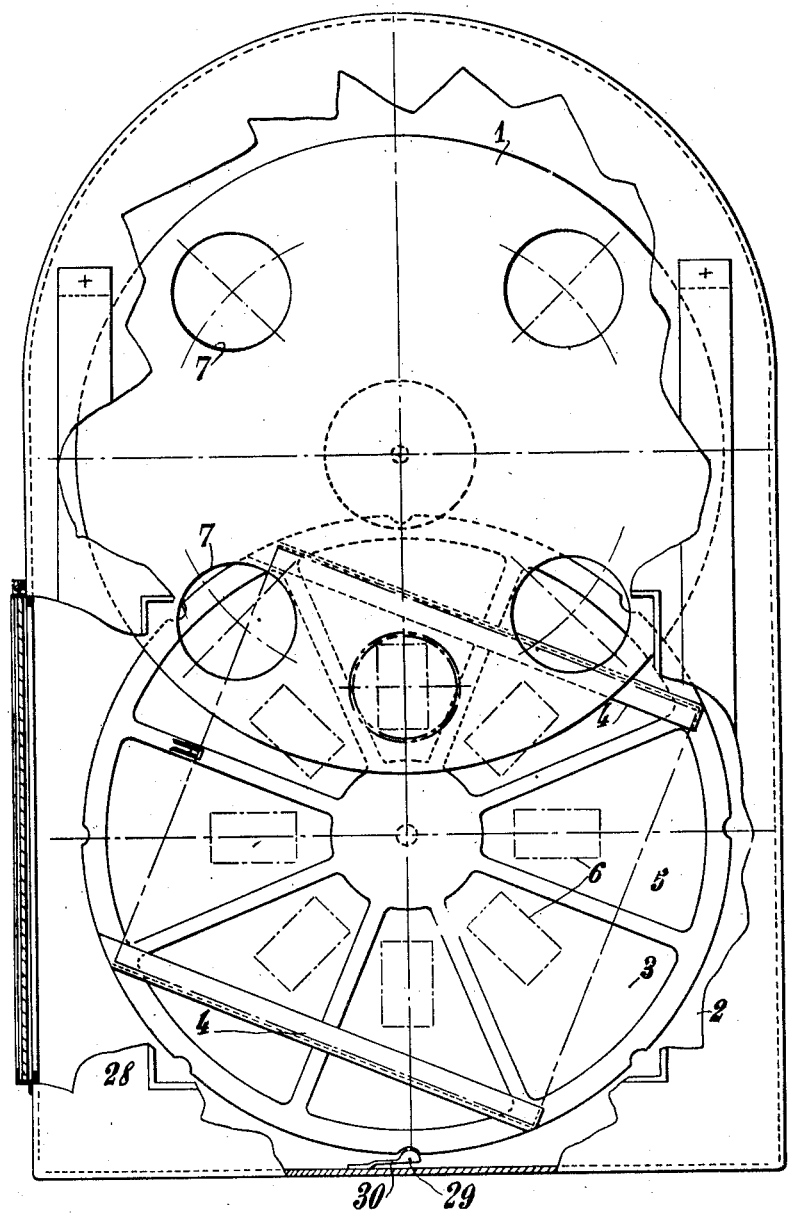

Feb. 24, 1931.  R. DAUGÉ  1,794,279
APPARATUS FOR PHOTOGRAPHIC ENLARGEMENTS BY SUPERPOSED IMPRESSIONS
Filed May 8, 1928  3 Sheets-Sheet 1

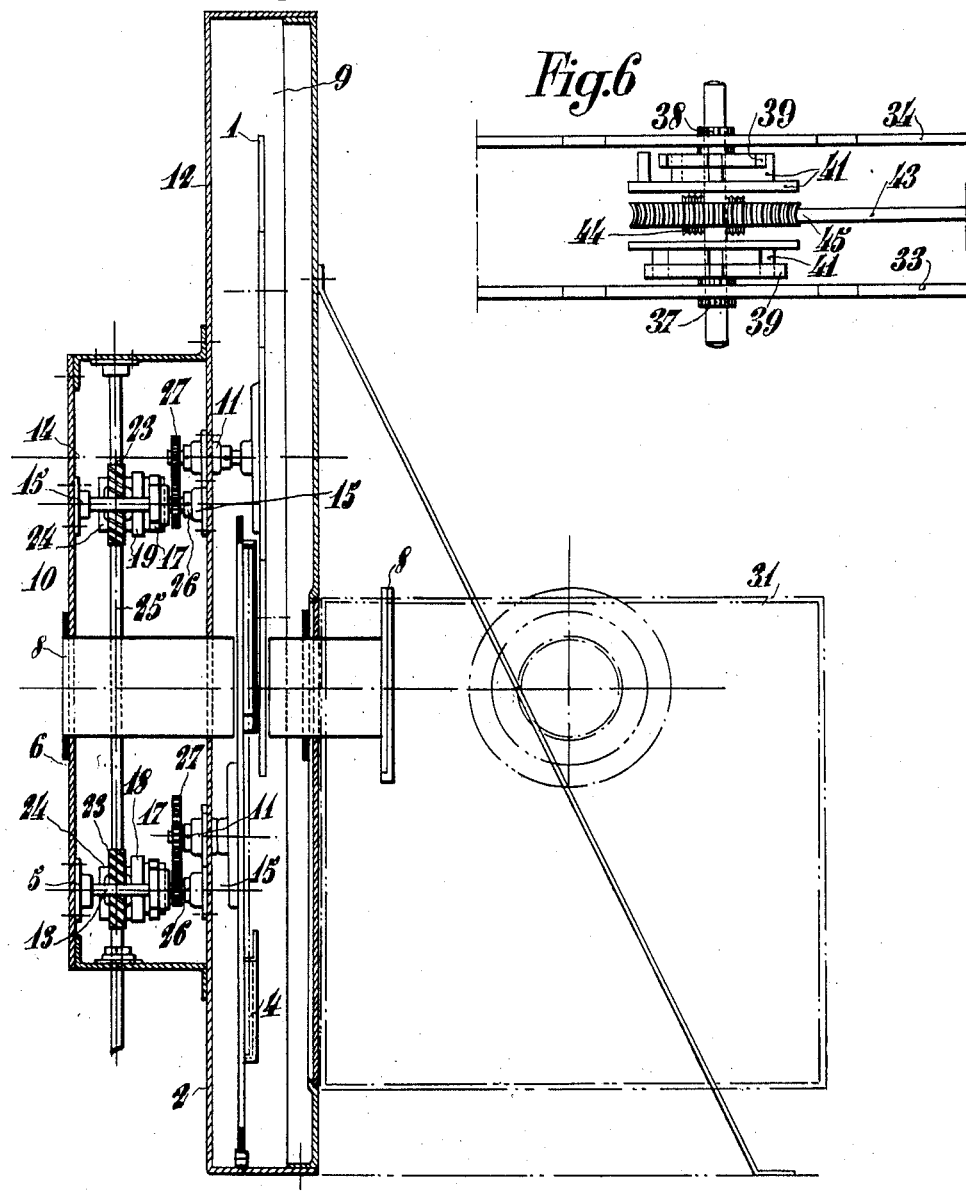

Feb. 24, 1931.   R. DAUGÉ   1,794,279
APPARATUS FOR PHOTOGRAPHIC ENLARGEMENTS BY SUPERPOSED IMPRESSIONS
Filed May 8, 1928   3 Sheets-Sheet 3
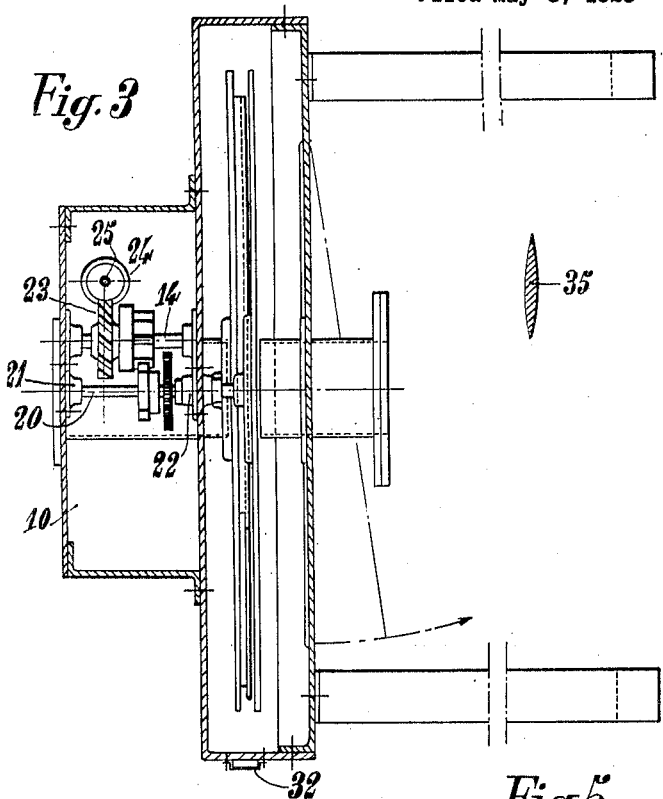
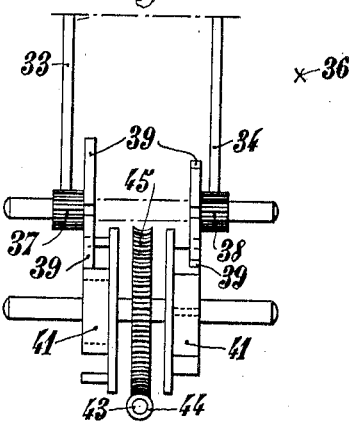
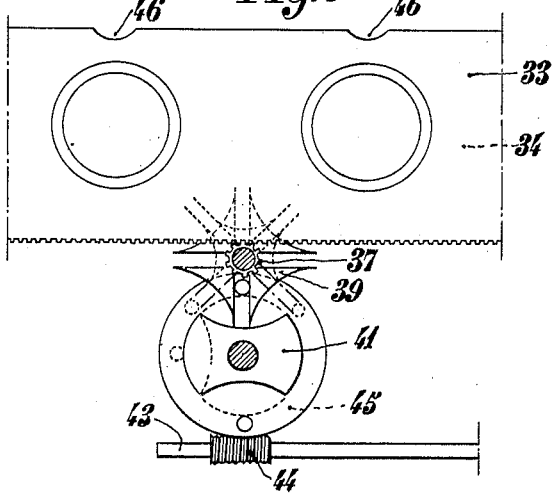
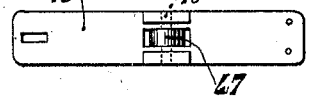
R. Daugé
INVENTOR Patented Feb. 24, 1931

1,794,279

UNITED STATES PATENT OFFICE

ROBERT DAUGÉ, OF RUEIL, FRANCE

APPARATUS FOR PHOTOGRAPHIC ENLARGEMENTS BY SUPERPOSED IMPRESSIONS

Application filed May 8, 1928, Serial No. 276,142, and in France May 11, 1927.

The present invention relates to an apparatus for photographic enlargements by superposed impressions, that is to say by projections, on one and the same surface to be impressed, of several similar images differently placed on one and the same sensitized layer, so that the texture of the latter does not intervene for compromising the clearness of the images obtained with very great enlargements.

This apparatus is characterized by the combination of two surfaces one of which receives the plate which carries, in multiple impressions, the image to be enlarged, and the other constitutes an obturator for successively covering and uncovering an optical projection and enlargement system, both surfaces being subjected to intermittent displacements combined by a mechanism the actuation of which derives from a single shaft.

The accompanying drawing illustrates, by way of example only, two forms of construction of the apparatus above characterized.

Figs. 1 to 3 relate to a first form of construction and are:

Fig. 1 a front view of the apparatus with parts broken away.

Fig 2 a cross section of the apparatus.

Fig. 3 a horizontal section.

Figs. 4 to 8 relate to a second form of construction and are:

Fig. 4 a partial cross section of the apparatus.

Fig. 5 a partial front view.

Fig. 6 a corresponding plan view.

Fig. 7 an elevation of a detail.

Fig. 8 a corresponding plan view.

It is to be noted that the enlargement apparatus forming the subject-matter of the invention is also used as apparatus for taking views for impressing on zones regularly distributed about its center, one and the same plate which, from this fact, bears several times the same image, or for impressing independent plates. Each proof of the image is variously orientated relatively to the lines of distribution of the molecules or constituent elements of the sensitized layer, so that these images being projected very enlarged and superposed on one and the same surface which can be impressed, the single proof obtained presents shades modeled without discontinuities, since the intermolecular spaces of a first projection are occupied by the molecular spots of the following images successively projected.

In the form of construction of Figs. 1 to 3, the apparatus comprises two discs arranged in two parallel planes and of which, the obturator-disc 1 is arranged between the other, the plate-carrying disc 2 and a source of light. Both discs 1 and 2 are projected on a plane which is parallel thereto, according to two circles which intersect each other, as shown in Fig. 1.

The plate-carrying disc 2 is, in the example illustrated, constituted by a sheet-iron plate provided with large openings 3 in the shape of regularly distributed sectors. Two slides 4, secured in position by welding or other suitable means, receive and hold the plate 5 on which are distributed the successive impressions 6 of the same image to be enlarged. In the example illustrated, the disc 2 presents eight openings 3 in the shape of sectors, and the plate 5 has eight images 6 regularly distributed about its center mingled with the center of the disc 2. The images are placed opposite the apertured sectors 3. The obturator disc 1 is, for instance, cut out in a sheet-iron plate and presents four apertures 7.

The circular trajectories of the images 6 and of the apertures 7 constantly intersect opposite an objective 8. The frame of the apparatus comprises, in the example illustrated, two parallelepipedic enclosures or chambers 9 and 10 made of sheet-iron and light-tight, at least concerning the chamber 9.

Each disc is supported by an axis centered in a bearing 11 suitably secured to the wall 12. Counter shafts 13 and 14 are supported, parallel to the axes of the discs, by bearings 15 respectively secured on the walls 12 and 16; on these counter-shafts 13 and 14 are rigidly secured Geneva wheels 17 the actuating arms of which are carried by plates 18 and 19 rigidly secured on shafts 20 supported by bearings 21 and 22 (Fig. 3). A tangent wheel 23 rigidly secured on each of the shafts 14 and 15 constantly gears with a worm 24 fast on a vertical shaft 25 which constitutes the driving shaft of the mechanism and receives its movement, externally to the chamber 10, from any suitable driving source.

The intermittent movement of the Geneva wheels 17 and, consequently, of the shafts 13 and 14 is transmitted to the discs 1 and 2 by gears 26 and 27 or any other suitable kinematic device.

But, the features of the kinematic connection, between the driving shaft 25 and the axes of the discs 1 and 2 respectively, are such that the angular distances travelled over by the disc 1 for a quarter of a revolution of its driving Geneva wheel, are double those travelled over in the same conditions by the plate-carrying disc 2.

It is essential, in order that the projected images may be exactly superposed on the surface to be impressed, that the stoppages of the disc 2 should take place in rigorously determined angular positions. For that purpose, the disc 2 can be provided with peripheral notches 28 in which enters a stop member 29 arranged at the end of a returning spring 30 secured to the lower part of the enclosure or casing 10.

The operation of the apparatus thus described, either as apparatus for taking views, or as apparatus for the projection of images for enlargement, is as follows:

In both cases, both discs 1 and 2 intermittently rotate. The disc 1 rotates for ¼ of a revolution when the disc 2 rotates for ⅛ of a revolution. Upon stoppage, an image 6 is placed opposite the objective 8 and opposite an aperture 7 of the disc 1, so that either the impression of the plate 5 for an image, or the projection of an image for enlargement can take place.

It is obvious that the obturator-disc 1 might be provided with a single aperture 7 instead of four. In this case, the value of these intermittent angular displacements would necessarily be of 360 degrees. In the particular example described, the number eight for the number of the images and four for the number of the orifices or apertures of the obturator-disc, have been adopted as satisfying both a suitable clearness of the enlarged images and admissible speeds of rotation for the discs. These numbers obviously are not essential for the invention.

The apparatus can be mounted on any suitable base or support and provided with a set of objectives allowing to utilize it indifferently for taking images and for the enlargement of these images. The said base or support for the apparatus can be mounted on an adjustable tripod in the same way as for known photographic or kinematographic apparatus.

The apparatus described in its essential lines, is completed by a movable door 31 adapted to allow of verifying the placing in position of the plate 5. It is provided with a side opening 32 for the introduction of the plate 5 between the slides 4 of the plate-carrying disc 2. The opening 32 must, of course, be provided with an obturator, of any suitable arrangement, light-tight, as well as the bearing edges of the door 31. The source of light used for the projection can be constituted by any projection lantern independent of or integral with the frame of the apparatus.

In the example of construction illustrated in Figs. 4 to 8, the surface bearing the images to be enlarged and the apertured opaque surface for constituting the obturator receive intermittent rectilinear displacements.

The obturator 33 is suitably guided in slides and is movable in a horizontal plane. The plate 34 on which are secured the images to be enlarged is, in the same way, horizontally movable in slides. The objective is arranged at 35 and the source of light is placed at 36, the frame of the apparatus comprising the same general arrangements as for the example of construction of Figs. 1 to 3.

The intermittent rectilinear movements of the parts 33 and 34 with suitable putting in phase of these movements, as explained in the preceding example, is obtained, from a single driving shaft, in the following manner:

The lower edge of the obturator 33 and that of the image-carrier 34 are cut as racks respectively gearing with pinions 37 and 38. Each of these pinions is angularly rigid with a Geneva wheel 39 the actuation of which is effected by a plate 41 provided with driving fingers. Both plates 41 are fast on one and the same axis 42 which is caused to continuously rotate by the driving shaft 43, the angular connection between the shaft 43 and the axis 42 being ensured, for instance, by means of a worm 44 and of a tangent wheel 45.

As in the example of Figs. 1 to 3, the obturator 33 can receive intermittent displacements which are double those imparted to the image-carrier. For that purpose, the plate 41 corresponding to the pinion 37, is provided with two driving fingers of the Geneva wheel 39, whilst the other plate 41 has only one. The principle of operation remains the same as for the apparatus of Figs. 1 to 3, the intermittent angular displacements being replaced by intermittent rectilinear displacements.

In order that the stoppages of the obturator 33 and of the image-carrier 34 should take place at rigorously determined points, the device diagrammatically illustrated in Figs. 7 and 8 can be adopted.

On their upper edge, the parts 33 and 34 are provided with notches 46 in each of which can successively enter a roller 47 loosely mounted on an axis 48 welded or secured in any other manner, on a resilient support conveniently constituted by a spring or curved blade 49 suitably secured at its ends on a fixed part of the frame of the apparatus.

It is to be understood that the invention is not limited to the examples particularly described and illustrated. These examples are capable of receiving modifications in the constitution of their various parts as well as in the relative arrangements of the latter.

All these modifications, provided they satisfy to the essential feature set forth in the foregoing as well as the object sought for, are included in the scope of the invention.

What I claim as my invention and desire to secure by Letters Patent is:

1. In an apparatus for taking multiple pictures of the same object upon a plate film and subsequently enlarging the said pictures by superposed impressions, an enclosure impervious to the light, a disc mounted upon a shaft for rotating in the said enclosure, means upon the said disc to support a plate or film, means for adapting, upon the enclosure, optical devices in the field of which the disc may bring successive zones of the plate or film, an obturator for covering and uncovering the zone of the plate of film which are in the field of the optical devices, means for imparting to the disc intermittent angular displacements, and means to synchronize the said displacements with those of the obturator.

2. In an apparatus for taking multiple pictures of the same object upon a plate or film and subsequently enlarging the said pictures by superposed impressions, an enclosure impervious to the light, an apertured disc mounted upon a shaft to rotate in the said enclosure, means upon the said disc to support a plate or film, means for adapting, upon the enclosure, optical devices in the field of which the disc may bring successive zones of the plate or film, a revolving obturator the driving shaft of which is parallel to that of the disc, a pinion upon each of the said shafts, two Geneva wheel mechanisms, means for angularly connecting the said mechanisms with the said shafts, a single driving shaft rotated, in a continuous manner, and means for connecting the said driving shaft with the Geneva wheel mechanisms.

In testimony whereof I have signed my name to this specification.

ROBERT DAUGÉ.